United States Patent [11] 3,626,229

[72] Inventors Henry S. Spacil
 Schenectady, N.Y.;
 Wayne R. Hellman, Euclid; Peter R. Buccilli, South Euclid, all of Ohio
[21] Appl. No. 32,927
[22] Filed Apr. 29, 1970
[45] Patented Dec. 7, 1971
[73] Assignee General Electric Company

[54] JACKETED ALKALI METAL HALIDE VAPOR LAMP WITH GETTER
 10 Claims, 3 Drawing Figs.
[52] U.S. Cl. .................................................. 313/25,
 313/174, 313/184, 313/223, 313/229
[51] Int. Cl. .................................................. H01j 61/52
[50] Field of Search .................................................. 313/25,
 174, 184, 223, 229

[56] References Cited
UNITED STATES PATENTS
2,749,462  6/1956  Kenty et al. ................... 313/25

Primary Examiner—Raymond F. Hossfeld
Attorneys—Ernest W. Legree, Henry P. Truesdell, Frank L. Neuhauser, Oscar B. Waddell and Joseph B. Forman ABSTRACT: In a jacketed alkali metal halide vapor lamp, loss of alkali metal takes place by the reaction of water vapor in the outer jacket with alkali metal ions which pass out of the inner arc tube through the silica wall to form gaseous metal hydroxide and protons (positively charged hydrogen ions). The protons pass into the arc tube through the silica wall and react with the metal halide to form metal ions and hydrogen which diffuses out. When the ration of $H_2/H_2O$ in the jacket reaches a sufficiently high value, direct reaction of alkali metal ions with hydrogen can continue indefinitely the transfer of alkali metal from the arc tube to the jacket. It is prevented by a getter in the interenvelope space holding the hydrogen pressure down to about $10^{-7}$ atmospheres or lower, preferably about $10^{-9}$ atmospheres. A suitable getter is zirconium operating in the temperature range from 350 to 450° C. in sufficient quantity and with low enough initial hydrogen content that its hydrogen content during operation stays below a maximum of about 1,000 p.p.m. (atomic).

Inventors:
Henry S. Spacil
Wayne R. Hellman
Peter R. Buccilli
by Ernest W. Legree
Their Attorney

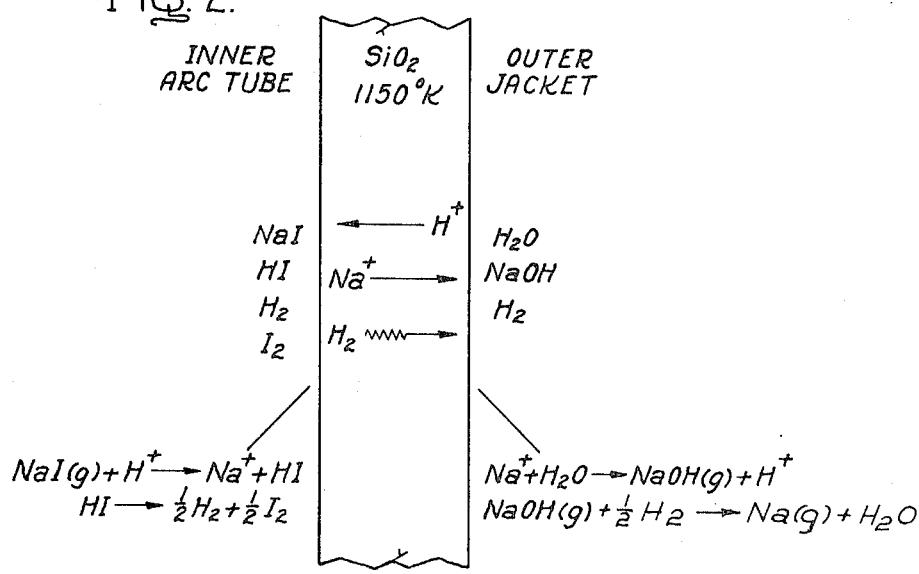
ARC TUBE CROSS-SECTION SHOWING SURFACE REACTIONS AND TRANSPORT OF IONIC AND MOLECULAR SPECIES.
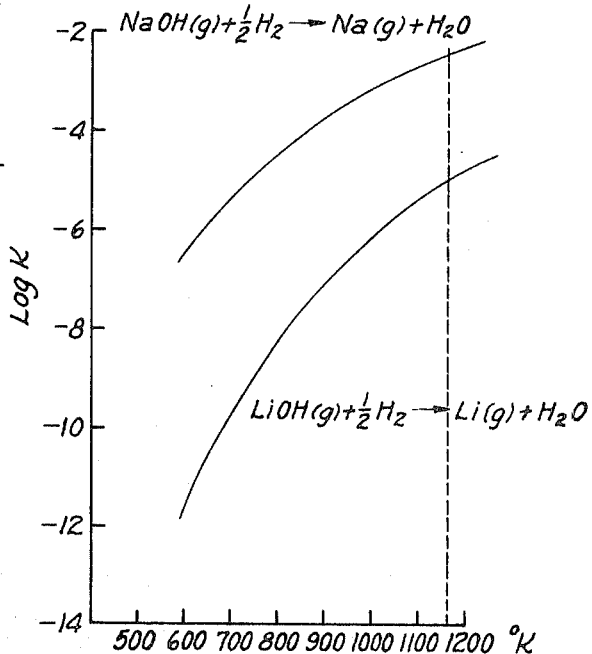
EQUILIBRIUM CONSTANT FOR REDUCTION OF GASEOUS NaOH AND LiOH TO THE METAL VAPOR. DASHED LINE IS BOILING POINT OF Na.
Inventors:
Henry S. Spacil
Wayne R. Hellman
Peter R. Buccilli
by
Their Attorney

JACKETED ALKALI METAL HALIDE VAPOR LAMP WITH GETTER

BACKGROUND OF THE INVENTION

The invention relates to metallic vapor arc lamps wherein an arc discharge takes place through an ionizable medium including alkali metal halides contained in a silica arc tube. The invention is more particularly concerned with preventing the loss of alkali metal from the silica arc tube in order to improve the maintenance and increase the life of the lamp.

The invention is particularly useful in mercury metal halide lamps which operate by sustaining a plasma of metal ions and electrons produced by the dissociation of several metal iodides at very high temperature. Such lamps are described and claimed in U.S. Pat. No. 3,234,421—issued to Gilbert H. Reiling, on Feb. 8, 1966, entitled "Metallic Halide Discharge Lamps" and assigned to the same assignee as the present invention. Among the particularly desirable features of this type of lamp are a very favorable spectral color distribution, high efficacy reaching up to 100 lumens per watt, long potential life, and possibility of interchangeability with conventional mercury lamps of the same wattage.

In its general construction and appearance, the metal halide lamp resembles a conventional high-pressure mercury vapor lamp comprising a high melting temperature glass or silica arc tube mounted within a glass outer jacket. The more widespread type is single-ended and provided with a screw base at one end. Thermionic main electrodes are provided at the ends of the arc tube which contain a quantity of mercury and metal halides along with an inert gas for starting purposes. By way of example, one lamp which is in commercial production by applicants assignee and which is known as the 400-watt Multi-Vapor lamp contains mercury, sodium iodiole, thallous iodide and indium monoiodide and achieves a balanced color distribution in the visible range at an efficacy of 85 to 90 lumens per watt.

A stubborn problem which has existed with metal halide lamps wherein one of the metals is an alkali metal, generally sodium or lithium, is loss of the alkali metal from the arc tube during operation. Such loss leads to rise in operating voltage, deterioration of color quality towards the blue, and reduction in efficiency culminating in failure of the arc tube itself. A known mechanism by which such loss can occur is photoelectrolysis wherein alkali metal ions diffuse through the silica. Photoelectrolysis can be suppressed in various ways, all aimed at reducing the number of short wavelength photoelectrons reaching the outside of the silica arc tube where they are able to reduce sodium ions diffusing through the silica. Despite such measures, sodium-containing lamps still show a loss of this species under service conditions.

The foregoing has suggested that some other general mechanism, which like photoelectrolysis involves diffusion of sodium or other alkali metal through silica, is operative. Such a mechanism leading to a low but significant sodium loss rate would not have been observed in the presence of another mechanism such as photoelectrolysis taking place at a relatively high rate. But with elimination of the latter, the effects of the additional sodium loss taking place at the low rate have become apparent. The object of the invention is to identify such low rate loss mechanism responsible for alkali metal loss and to provide an appropriate cure for it.

SUMMARY OF THE INVENTION

In accordance with our invention, we have postulated for the loss of alkali metal from the arc tube after the elimination of photoelectrolysis as a cause, the following mechanism involving two reactions. The first reaction is given by $$MI + H_2O \rightarrow MOH + HI \quad \text{I}$$

wherein $M$ represents the alkali metal. The water ($H_2O$) and alkali metal hydroxide ($MOH$) are in the outer jacket, the alkali metal iodide ($MI$) and hydrogen iodide ($HI$) are inside the arc tube, and the alkali metal and hydrogen are transferred through the silica wall of the arc tube in opposite directions as $M+$ and $H+$ ions. Within the arc tube, the stability of $HI$ is low (equilibrium constant of about 5) so that it will dissociate appreciably to $I_2$ and $H_2$. The latter diffuses through the silica wall as molecular hydrogen, thus returning $H_2$ to the jacket atmosphere and causing a buildup of hydrogen pressure in the jacket.

When the $H_2/H_2O$ ratio in the jacket reaches a sufficiently high value, alkali metal $M$ will continue to be lost from the arc tube by the second reaction as follows:

$$MI + \tfrac{1}{2}H_2 \rightarrow M + HI \quad \text{II}$$

where now $H_2$ and $M$ are in the outer jacket, and $MI$ and $HI$ are inside the arc tube as before. In each case the overall reaction rate is limited by the low but finite diffusion rate of protons ($H+$) through the silica arc tube wall.

Reaction I consumes $H_2O$ and can continue only so long as there is water vapor present to fuel it. Reaction II, however, can continue indefinitely if there is any hydrogen present because $H_2$ is not consumed or tied up in the process and, if water vapor is the initial source of hydrogenous material in the outer jacket, only half of the initial hydrogen can be removed by reaction I. Hence there results a mechanism by which the alkali metal, sodium or lithium, can be completely removed from the arc tube. In accordance with our invention, such loss of alkali metal is prevented by providing in the interenvelope space between jacket and arc tube a getter capable of holding the hydrogen pressure in the jacket down to about $10^{-7}$ atmospheres. A suitable getter is zirconium operating at about 350° to 450° C. in a quantity large enough and having a low enough initial hydrogen content that its hydrogen content during operation stays below a maximum of about 1,000 parts per million (atomic).

DESCRIPTION OF DRAWINGS

In the drawings:

FIG. 2 shows schematically a silica arc tube cross section and indicates reactions involving transport of ionic and molecular species.

FIG. 3 shows the equilibrium constant for the reduction of gaseous NaOH and LiOH to the metal vapors.

DETAILED DESCRIPTION OF INVENTION

Lamp Structure

Figure 1:
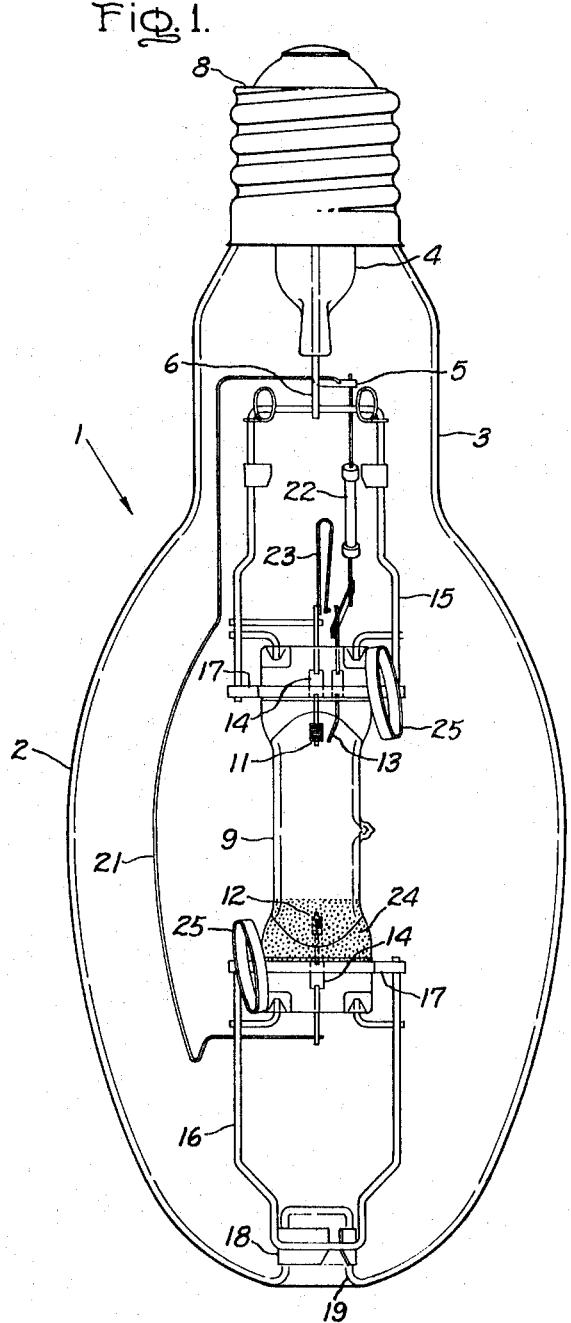
FIG. 1 shows in a side view a metal halide lamp embodying the invention.

Referring to FIG. 1, a typical mercury metal halide vapor arc lamp 1 in which the invention may be embodied comprises an outer vitreous envelope or jacket 2 of ellipsoidal form having a neck portion 3. The neck is closed by a reentrant stem 4 through which extend stiff inlead wires 5,6 connected at their outer ends to the contacts of a screw-base 8 and at their inner ends to the inner arc tube 9.

The inner arc tube is made of quartzlike glass or fused silica and has sealed therein at opposite ends main arcing electrodes 11,12 plus an auxiliary-starting electrode 13. The electrodes are supported on inleads which include intermediate thin molybdenum foil sections 14 hemetically sealed through the flattened or pinched ends of the arc tube. The main electrodes 11,12 each comprise a double layer tungsten wire helix wrapped around a tungsten core wire and activated by thorium oxide which coats the turns and fills the interstices within the helix.

The arc tube is supported within the outer jacket by a divided or two-part mount, 15 at the base end and 16 at the dome end. Each part comprises a pair of longitudinally extending support rods bridged by metal straps 17 which clamp about the pinched ends of the arc tube. The base end mount part is welded to inlead 6 and serves as a conductor to main electrode 11. The dome end mount part has attached thereto a springy collar 18 which engages a reentrant nipple 19 in the dome end of the jacket. Main electrode 12 is connected to inlead 5 by curving wire 21. Starting electrode 13 is connected to inlead 5 through current limiting resistor 22. A thermal switch 23 consisting of a bimetal is arranged to short circuit auxiliary electrode 13 to main electrode 11 after the lamp warms up in accordance with the teachings of U.S. Pat. No. 3,226,597 Green. The two-part mount construction is in accordance with the teachings of copending application Ser. No. 744,756 of Leonard F. Karmel and Stanley D. Tabor, filed July 15, 1968, entitled "Arc Tube Mounting" and similarly assigned.

In a metal halide lamp produced commercially by applicants' assignee and sold under the designation Multi-Vapor, the arc tube contains argon at a pressure of about 25 torr, a quantity of mercury substantially vaporized during operation and exerting a partial pressure of 1 to 15 atmospheres, a quantity of sodium iodide in excess of that vaporized at the operating temperature, plus smaller amounts of thallium iodide and indium iodide. In the illustrated lamp which is a 400-watt size, and also in smaller sizes, the jacket is evacuated. In larger sizes such as 1,000 watts, the jacket is filled with an inactive gas, suitably nitrogen at about one-half of an atmosphere pressure.

Alkali Metal Loss

Loss of alkali metal such as sodium from the arc tube in a metal halide discharge lamp leads to undesirable changes in electrical characteristics such as an increase in arc drop and a rise in the starting voltage. Also a reduction in efficiency and a degradation of spectral characteristics with loss of the red component occur. Sodium loss can take place by electrolysis of sodium through the silica wall of the arc tube. Electrolysis has been theorized to occur under the influence of photoelectrons emitted by metal parts of the frame which support the arc tube such as the side rods under ultraviolet irradiation. The photoelectrons produce a negative potential on the outside surface of the arc tube which neutralizes the Na+ ions diffusing through the silica. Other alkali metal atoms including Li, K, Rb, and Cs would also be subject to a similar loss mechanism.

Losses of Na by photoelectrolysis can be held to tolerable levels or photoelectrolysis effectively suppressed in various ways which have the effect of reducing the number of short wavelength photoelectrons reaching the outside of the silica arc tube. One convenient way is the use of a side-rodless or integral mount construction of the kind originally disclosed in U.S. Pat. No. 2,888,585—Martt et al. and improved in the aforementioned copending Kramel and Tabor application. Another way consists in coating the side rods with an insulating material. Notwithstanding the foregoing measures, sodium containing lamps still show a loss of this species under service conditions. This has led us to conclude that there is some other general mechanism in operation which allows the diffusion of sodium or other alkali metal through silica and which is responsible for a low but significant sodium loss rate which has not been observed heretofore. The need to identify such mechanism and provide a remedy has become greater by reason of higher and more uniform sodium iodide pressure within the arc tube achieved through asymmetrical constructions which reduce the temperature spread between hot and cold regions of the arc tube. In the illustrated lamp intended for baseup operation, this is achieved by the heat reflective coating 24 on the lower end only of the arc tube and an electrode 12 at the lower end which is smaller than electrode 11 at the upper end described and claimed in copending application Ser. No. 5759 of Wayne R. Hellman, filed Jan. 26, 1970, entitled "Metal Halide Lamp" and similarly assigned.

Any sodium loss mechanism which has a driving force proportional to the NaI pressure or some function of this pressure will take place even more rapidly under these conditions.

Mechanism of Proton Exchange

In accordance with our invention, we have postulated that loss of alkali metal such as sodium can take place through two reactions, both of which involve transport of sodium ions and positively charged hydrogen ions or protons in opposite directions through the silica wall of the arc tube. The first overall reaction with reactants and products considered to be gaseous is as follows:

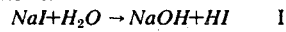

$NaI + H_2O \rightarrow NaOH + HI$  I where the water ($H_2O$) and sodium hydroxide ($NaOH$) are in the outer jacket and the sodium iodide ($NaI$) and hydrogen iodide ($HI$) are inside the arc tube. The postulated reactions on both sides of the silica wall are shown in FIG. 2 which represents a section through the silica arc tube wall at a temperature of about 1,150° K. At the outside of the wall, $H_2O$ reacts with $Na^+$ to form gaseous $NaOH$ and a proton $H^+$. The proton diffuses through the silica wall to the inside of the arc tube where it reacts with gaseous $NaI$ to form another sodium ion $Na^+$ and $HI$. The sodium ion diffuses out through the silica wall into the jacket volume to repeat the process. The stability of $HI$ is low (equilibrium constant of about 5), so that it will dissociate appreciably to $I_2$ and $H_2$. The latter will diffuse through the silica wall as molecular hydrogen, thus returning $H_2$ to the jacket volume. The gaseous $NaOH$ condenses on the colder portions of the jacket, thus removing oxygen and part of the hydrogen from the atmosphere in the jacket, the remainder of the hydrogen remaining in gaseous form and increasing the hydrogen pressure as the water vapor is consumed.

When the $H_2/H_2O$ ratio in the jacket reaches a sufficiently high value, sodium will continue to be lost from the arc tube by the second overall reaction with reactants and products considered to be gaseous as follows:

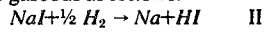

$NaI + \frac{1}{2} H_2 \rightarrow Na + HI$   II where now hydrogen ($H_2$) and sodium ($Na$) are in the outer jacket while sodium iodide ($NaI$) and hydrogen iodide ($HI$) are inside the arc tube as before. In this case it is metallic sodium vapor $Na$ that is condensed on the colder portions of the jacket while hydrogen is merely cycled through the silica wall. The hydrogen is transferred inward into the arc tube as a proton $H^+$ to balance the out diffusion of sodium ions $Na^+$, and then diffuses back out as molecular hydrogen thereby maintaining the hydrogen gas-pressure in the jacket. Rather than taking place directly, reaction II may be considered to proceed as a sequence consisting of reaction I followed by reduction of gaseous $NaOH$ to gaseous $Na$ and $H_2O$. Sodium metal will then condense on the jacket while $H_2O$ will react with a sodium ion migrating through the silica wall to form additional gaseous $NaOH$ and a proton $H^+$ with the same ultimate result. The equilibrium constants shown in FIG. 3 indicate that substantial reduction of gaseous $NaOH$ and $LiOH$ will occur for $H_2/H_2O$ ratios of from 1 to 100 when the sum of the $H_2$ and $H_2O$ pressures is of the order of $10^-$ atm. The amounts of water vapor typically present in the jacket of a lamp due to contamination, $OH^-$ in the glass, residual impurities, etc. lead to $H_2O$ pressures of this magnitude in operation.

While reaction I can occur only while water vapor is present in the outer jacket, reaction II can continue to operate indefinitely because $H_2$ is not consumed in the process and hence it provides a mechanism by which $Na$ can be completely removed from the arc tube.

Gettering Objectives

On the basis of the postulated reactions, loss of sodium or other alkali metal can be suppressed or reduced by observing the two following requirements for the jacket atmosphere: (1) the water content should be reduced to the lowest level possible, and (2) reducing conditions during operation, that is high $H_2/H_{ao}O$ ratios, should be avoided. This means that either $H_2O$ should be gettered in order that no $H_2$ be formed through reaction I, or $H_2$ should be gettered in order to prevent the occurrence of reaction II. Ordinarily the amount of water vapor present in the outer jacket of a metal halide lamp such as the Multi-Vapor 400-watt lamp illustrated in the drawing will allow removal of only about 10 percent of the sodium from the arc tube by operation of reaction I. Therefore ultimately it is reaction II which must be prevented for long periods of time and it is accomplished by reducing the residual hydrogen pressure to lower levels than heretofore.

In accordance with our invention, the residual hydrogen pressure in the outer jacket should be reduced at least one order of magnitude below $10^-6$ atmospheres, that is by a factor of 10 down to $10^-7$ atmospheres, in order to achieve an appreciable reduction in sodium loss. We have calculated the maximum pressure of hydrogen which can be tolerated without incurring excessive loss of sodium from the arc tube through reaction II during typical lamp lifetimes. For a lifetime of 10,000 hours, kinetic considerations limit the maximum value of $p_{Na}$ permissible in the outer jacket of a vacuum jacketed lamp to $10^{-13}$ atmospheres. Assuming that $p_{NaI}$ is $6 \times 10^{-4}$ atm. and that $p_{HI}$ is $10^{-3}$ atm., an average arc tube wall temperature of 1,150° K. leads to a value for the equilibrium constant of reaction II of $K_{II}=5\times10^{-9}$ and a corresponding value of $p_H$ of $10^{-9}$ atm. A residual hydrogen pressure of $10^{-9}$ atmospheres represents an extremely stringent requirement on elimination of traces of hydrogen from the outer jacket atmosphere. It means that the maximum residual hydrogen pressure permissible is about 1,000 times smaller than the objective of a few microns or $10^{-6}$ atmosphere considered sufficient in the past for mercury vapor lamps. For a lifetime objective less than 10,000 hours, a residual hydrogen pressure greater than $10^{-9}$ atmospheres may be tolerated, while a pressure even less than $10^{-9}$ atmospheres may be desirable for a lifetime objective exceeding 10,000 hours.

Getter Structure

In accordance with the invention, getters are provided within the jacket and located in the interenvelope space which preferably absorb any water vapor and which in any event absorb hydrogen to the extent that its vapor pressure is lowered at least to $10^{-7}$ atmospheres and preferably into the region of $10^{-9}$ atmospheres. Metals which are suitable and preferred for this purpose are zirconium and titanium and also alloys of zirconium/titanium. Zirconium is preferred because its ability to absorb hydrogen is less affected by surface layers of oxide than titanium.

Referring to FIG. 1, two zirconium getter rings 25 are provided attached by spot-welding to the end of the metal straps 17 clamping the ends of the arc tube. The location of the getter rings near the ends of the arc tube assure a temperature in the range of 350° to 450° C. during operation of the lamp and at this temperature zirconium is a good absorber of hydrogen. The ring shape permits the zirconium to be inductively heated after sealing of the lamp whereby to drive absorbed gases to the interior of the zirconium metal.

For the 400-watt Multi-Vapor lamp illustrated in FIG. 1, the two getter rings have a total volume of about 0.11 cm.³ which corresponds to $7.5\times10^{-3}$ mols of Zr. At a zirconium temperature of about 400° C. during operating, the mol fraction $x_H$ of hydrogen dissolved in solid solution or $\alpha$ phase in zirconium is related to the hydrogen pressure $p_{H2}$ as follows:
$$x_H^2/p_{H2}=1.3\times10^{+3}$$
For a hydrogen pressure of $10^{-9}$ atm., the value of the mol fraction $x_H$ is $1.1\times10^{-3}$ or 1,100 p.p.m. (atomic). This figure is about 6 percent of the solubility limit of hydrogen in zirconium and indicates that in order to maintain the hydrogen pressure down to the level required by the invention, there must be sufficient zirconium getter present to absorb all the hydrogen as a solid solution in the zirconium. In other words there must be sufficient zirconium that all of it remains in the $\alpha$ phase without ever reaching the point of zirconium hydride or $\delta$ phase formation by reaction with hydrogen which would entail a hydrogen pressure of $10^{-6}$ atmospheres.

Since loss of lumens and operating voltage rise are the direct result of sodium loss, maintenance of lumens and absence of voltage rise with life indicate the effectiveness of the measures taken to reduce sodium loss. The following table gives comparative results for two groups of lamps, one without and the other with a zirconium getter according to our invention, taken at 100, 500, and 1,000 hours of life.

|  | No Zr Getter | Zr Getter |
|---|---|---|
| 100 hours |  |  |
| Lumens per watt | 83.7 | 84.9 |
| 500 hours |  |  |
| Lumens per watt | 77.4 | 82.9 |
| % Lumens per watt | 92.5 | 97.6 |
| Voltage rise | 1.7 | 0.1 |
| 1,000 hours |  |  |
| Lumens per watt | 71.9 | 78.4 |
| % Lumens per watt | 85.9 | 92.2 |
| Voltage rise | 4.4 | 1.1 |

It will be observed that the loss in lumens at 1,000 hours is only 7.8 percent with the getter as against 14.1 percent without, and the voltage rise 1.1 with getter as against 4.4 without.

Comparison with Mercury Vapor Lamp

It has long been the practice to provide a piece of zirconium in the interenvelope space of certain mercury vapor lamps using hard borosilicate glass (Pyrex) outer jackets as a getter for hydrogen in order to prevent hard starting. This is taught in U.S. Pat. No. 2,749,462—Kenty et al. "High Pressure Mercury Vapor Lamp with Zirconium Getter." To prevent hard starting caused by hydrogen diffusing into the arc tube, the hydrogen pressure in the jacket was lowered to about $10^{-6}$ atm. This has been accomplished by the use of a relatively small piece of zirconium metal as a getter in which zirconium hydride or $\delta$ phase forms during gettering. The hydrogen pressure remaining is about $10^{-6}$ atmospheres, that is at least 10 times greater than $10^{-7}$ atmospheres which can be tolerated in an alkali metal halide containing lamp in order to achieve significant reduction in loss of sodium from the arc tube.

Preferably in a metal halide lamp in accordance with the invention designed for a 10,000-hour lifetime, the hydrogen pressure in the outer jacket is held down to about $10^{-9}$ atm. in order to prevent sodium loss. This requires that the zirconium getter operating at 350° to 450° C. be large enough and have a low enough initial hydrogen content so that its hydrogen content during operating never rises above a maximum of about 1,000 parts per million (atomic). This means that the getter must always remain as an $\alpha$ phase material without ever reaching the point of $\delta$ phase formation as in the prior mercury vapor lamps.

What we claim as new and desire to secure by Letters Patent of the United States is:

1. A jacketed high-intensity electric discharge device comprising:
   a quartz or quartzlike glass inner arc tube containing an ionizable filling including an alkali metal halide;
   a sealed vitreous outer jacket enclosing said inner arc tube;
   and gettering means within said outer jacket capable of holding the hydrogen pressure therein at least down to $10^{-7}$ atmospheres during the life of the device.

2. A device as in claim 1 wherein the gettering means is capable of holding the hydrogen pressure down to about $10^{-9}$ atmospheres.

3. A device as in claim 1 wherein the gettering means is zirconium, titanium or zirconium-titanium alloy.

4. A device as in claim 1 wherein the gettering means is zirconium operating in the temperature range of about 350° to 450° C. and in a quantity large enough and with a low enough initial hydrogen content that its hydrogen content during operation stays below a maximum of about 1,000 parts per million (atomic).

5. A device as in claim 1 wherein the gettering means is zirconium operating in the temperature range of about 350° to 450° C. and in a quantity large enough and with a low enough hydrogen content that it remains as an $\alpha$ phase material during life without ever reaching the point of $\delta$ phase formation.

6. A jacketed high-intensity electric discharge lamp comprising:
   a quartz or quartzlike glass inner arc tube containing an inert gas, mercury and metal halides including sodium iodide;
   a sealed vitreous outer jacket and frame means supporting said arc tube therein;
   and gettering means within said outer jacket capable of holding the hydrogen pressure therein at least down to $10^{-7}$ atmospheres during the life of the lamp.

7. A lamp as in claim 6 wherein the gettering means is capable of holding the hydrogen pressure down to about $10^{-9}$ atmospheres.

8. A lamp as in claim 6 wherein the gettering means is zirconium, titanium or zirconium-titanium alloy.

9. A lamp as in claim 6 wherein the gettering means is zirconium operating in the temperature range of about 350° to 450° C. and in a quantity large enough and with a low enough initial hydrogen content that its hydrogen content during operation stays below a maximum of about 1,000 parts per million (atomic).

10. A lamp as in claim 1 wherein the gettering means consists of pieces of zirconium metal attached to the ends of the arc tube whereby to be maintained in the temperature range of about 350° to 450° C. during operation of the lamp, said zirconium pieces being large enough and having initially a sufficiently low hydrogen content that the zirconium remains in $\alpha$ phase during the life of the lamp without ever reaching the point of $\delta$ phase formation.

* * * * *